United States Patent [19]

Smith

[11] Patent Number: 4,741,513
[45] Date of Patent: May 3, 1988

[54] STRAINER POST AND FITTING THEREFOR

[76] Inventor: Colin M. Smith, 15 Hillcrest Road, Merewether, New South Wales 2291, Australia

[21] Appl. No.: 942,764

[22] Filed: Dec. 17, 1986

[30] Foreign Application Priority Data

Dec. 17, 1985 [AU] Australia .............................. PH3901

[51] Int. Cl.⁴ ...................... E04H 17/20; F16B 7/00; F16B 7/04
[52] U.S. Cl. ...................................... 256/21; 256/68; 403/390; 403/391; 403/396
[58] Field of Search .................... 256/21, DIG. 5, 35, 256/32; 403/398, 396; 52/155, 165, 732, 728, 720; 24/274, 514, 569

[56] References Cited

U.S. PATENT DOCUMENTS

| | | | |
|---|---|---|---|
| 202,179 | 4/1878 | Lennon | 52/155 |
| 213,932 | 4/1879 | Powell | 52/155 |
| 304,586 | 9/1884 | Wade | 256/DIG. 5 X |
| 337,646 | 3/1886 | Allaben | 256/DIG. 5 X |
| 559,574 | 5/1896 | Diver | 52/155 |
| 970,116 | 9/1910 | Rudd | 256/DIG. 5 |
| 1,153,380 | 9/1915 | Fussell | 52/155 |
| 1,701,273 | 2/1929 | Pipp | 403/396 |
| 3,060,258 | 10/1962 | Spurgeon | 403/391 X |
| 3,363,374 | 6/1968 | Douglas | 403/398 X |
| 3,425,028 | 1/1969 | Neaderland | 403/390 X |
| 3,487,161 | 12/1969 | James et al. | 403/396 X |
| 3,738,072 | 6/1973 | Adrian | 52/728 X |
| 4,598,512 | 7/1986 | Chapman | 52/165 |

FOREIGN PATENT DOCUMENTS 2516579 5/1983 France .................... 256/DIG. 5

*Primary Examiner*—Randolph A. Reese
*Assistant Examiner*—John A. Ricci
*Attorney, Agent, or Firm*—Saidman, Sterne, Kessler & Goldstein

[57] ABSTRACT

A fitting and a method for facilitating clamping in a cluster a plurality of star posts to form a strainer post in a fence line, and comprising a yoke having radiating legs enclosing the star posts which are clamped to the yoke by an encircling U-bolt and recessed saddle, the yoke having slots in the ends of its spokes for capture upon the U-bolt and the saddle.

8 Claims, 3 Drawing Sheets

STRAINER POST AND FITTING THEREFOR

This invention relates to strainer posts for wire fencing. Strainer posts are regarded as those posts in a fence line which are subject to abnormal strain, such as in the case of gate or corner posts, or line posts and intermediate posts, especially those occurring at the bottom or top of a grade.

BACKGROUND ART

A common form of fencing post is that referred to as a "Star" post, being formed with three approximately equal and symmetrical flanges as viewed in cross-section. They are frequently used for droppers or as intermediate posts. Large stocks are invariably maintained by farmers and graziers together with a hand operated tubular rammer, or driver, therefor. For the erection and maintenance of fencing, however, strainer posts additionally need to be acquired together with specialised equipment for their erection. Also attachment bolts and plates require to be fixed to these posts, for example to support a gate. It has been conventional practice to provide these strainer posts of heavy timber, concrete or angle iron and their installation has been both expensive and inconvenient.

SUMMARY OF THE INVENTION

A principal object of the invention is to provide a strainer post construction which will alleviate this problem.

In accordance with the invention there is provided a fitting for guiding and holding in a cluster a plurality of fencing posts driven in juxtaposition into the ground to form a single strainer post, said fitting comprising a base, a U-bolt whose arms are threaded and pass through the base and are provided with nuts for clamping thereto, and a yoke captured between the U-bolt and the base and providing a plurality of spaces defined by the U-bolt and the yoke and the base, the arrangement being such that by tightening of the nuts for clamping said spaces are reduced in area.

The invention also provides a method of construction of a strainer post comprising inserting a first post through a first spaces in a first fitting, of the type referred to above, driving the post into the ground, inserting a second post through a second spaces in said fitting, driving the second post into the ground, locating a second fitting at an upper part of and enclosing said posts, and clamping said fittings upon the first and second posts as a cluster.

BRIEF DESCRIPTION OF THE DRAWINGS

The invention will be understood more clearly from a reading of the following passages together with the accompanying drawings, in which.

DETAILED DESCRIPTION OF INVENTION

Figure 1:
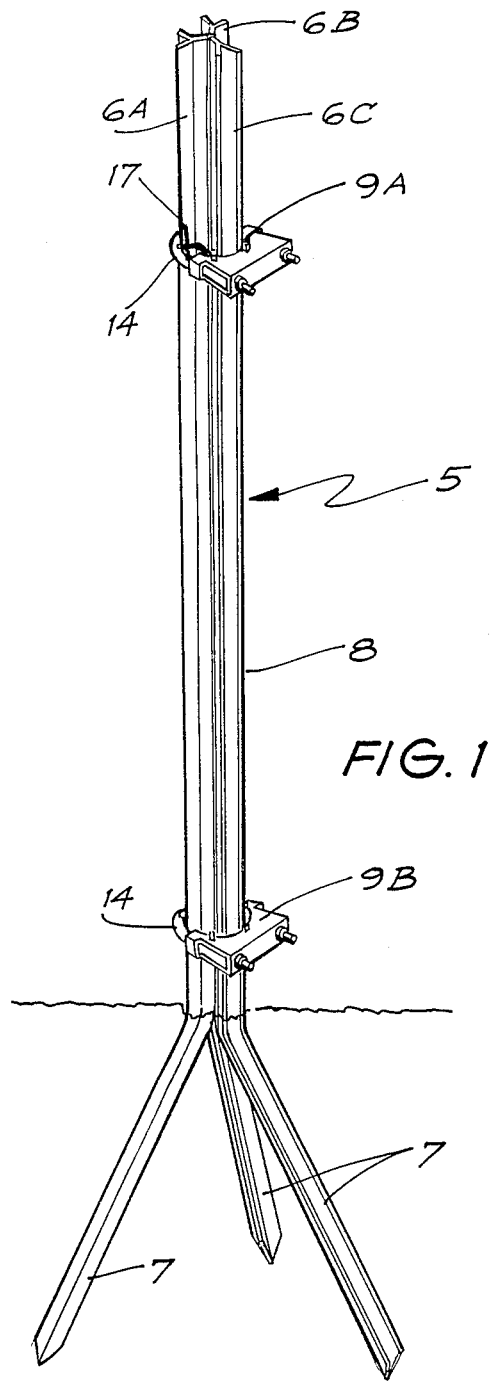
FIG. 1 shows in perspective a strainer post constructed according to this invention.

A strainer post 5 embodying the principles of the invention is depicted in FIG. 1 and consists of three Star posts 6A, 6B and 6C whose lower ends 7 have been driven into the ground. As can be seen they are held in a cluster 8 by a pair of clamp fittings 9A and 9B. As will become clear from the following description spaces are provided in each of the fittings 9A and 9B through which the posts are guided. In the erection shown in FIG. 1 a first post 6A is passed through a respective space in the lower fitting 9B at an inclination to the axis of the fitting and driven into the ground by a conventional hand operated tubular rammer. Successively the posts 6B and 6C are similarly driven into the ground and at different inclinations to the axis of the fitting. Alternatively, the posts 6A, 6B and 6C may be driven into the ground in parallel alignment. The three posts are then gathered into a cluster and the upper fitting 9A is threaded over their upper ends and the two fittings 9A and 9B clamped upon the resulting cluster 8 of these posts.

Conventional Star posts have been utilised as well as a conventional light duty rammer. The result is a post capable of serving as a strainer at any part of a fence line, and as will appear hereafter ready attachment of gate fixing brackets, compression struts and tension wires etc is available.

Figure 2:
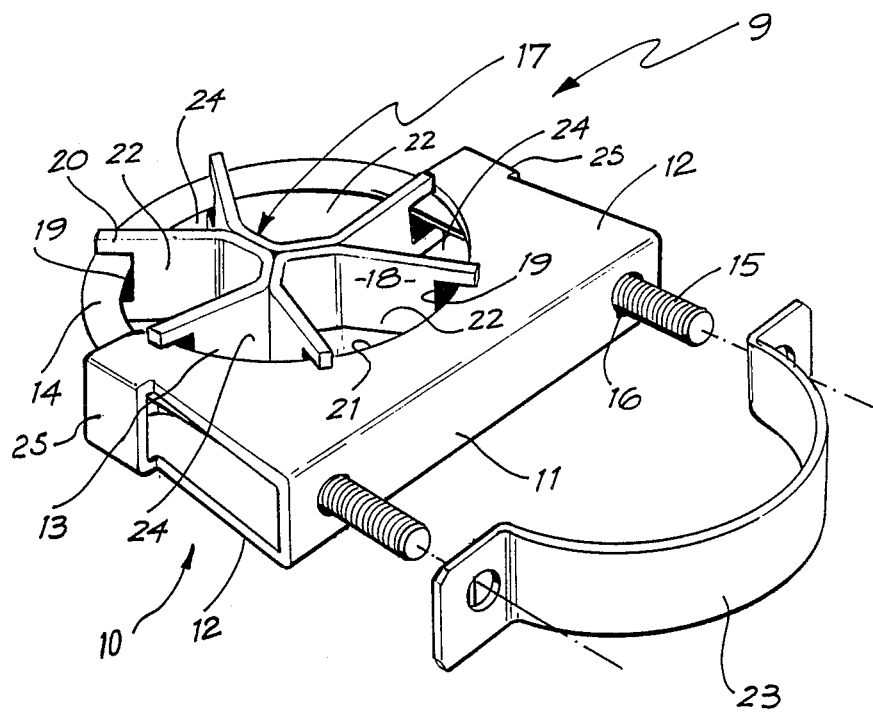
FIG. 2 shows to an enlarged scale the clamp fitting utilised.

A preferred form of clamp fitting 9 is shown in FIG. 2. The fitting consists of a U-shaped, or a channelled metal base, or saddle, 10 having a flat bottom 11 supporting side flanges 12 having confronting semi-circular cutouts 13. A U-bolt 14 having the ends of its arms 15 screw threaded passes through holes 16 in the base 10 and to which threaded nuts (not shown) may be screwed. The side flanges 12 of the base 10 are spaced barely enough to allow the U-bolt 14 to pass between and a pair of plates 25 interconnect the outer ends of the side flanges 12 for reinforcement. A yoke 17 is captured between the U-bolt 14 and the base 10 and is provided with a plurality of spokes 18 interconnected at a hub portion. The outer end of each spoke 18 is provided with a central square slot 19 and extending lugs 20 by which the yoke 17 is captured. As can be seen the slots 19 loosely accommodate the U-bolt 14 which protrudes from the base 10 and also encircle the arcuate edge 21 of the side walls 12 of the base 10. Thus, the yoke 17 is free to rotate in its captured position.

According to the embodiment shown in FIG. 2 three spaces 22 defined between the two spokes 18 of the yoke and the U-bolt 14 and the base 10 are provided each to accommodate a respective one of the posts 6A, 6B and 6C of FIG. 1. When nuts are tightened down on to the ends 15 of the U-bolt 14 the posts 6 are securely clamped within the fitting 9. FIG. 2 also depicts how a gate bracket 23 may be fastened beneath the nuts upon the fitting 9 before clamping is effected.

Figure 3:
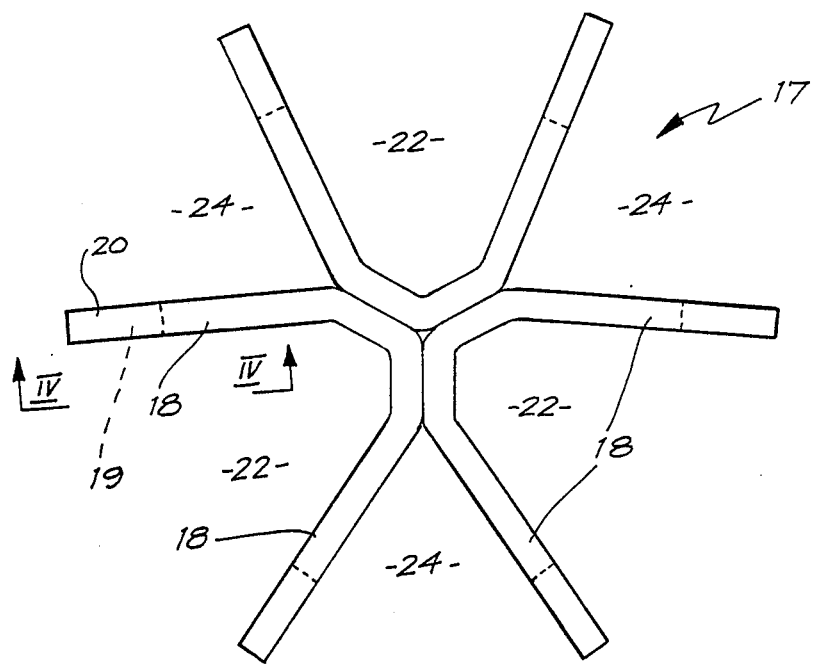
FIG. 3 shows in plan one form of yoke for incorporation in the clamp fitting; and, FIG. 4 shows to an enlarged scale the end portion of a spoke of the yoke viewed on the line IV—IV.

The yoke 17 is preferably constructed of sheet metal in say three angled sections which are interconnected either by welding or rivetting, and this construction is clearly illustrated in FIGS. 2 and 3. Besides the three spaces 22 provided for the Star posts 6, three additional spaces 24, alternating with the ampertures 22, are provided and are designed to facilitate clamping upon posts of other shapes and sizes which may be available for construction of a fence line. It is also feasible that fibreglass posts might be incorporated where construction of an electrified fence is required.

Figure 4:
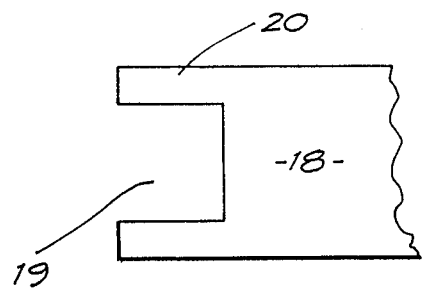

The formation of the outer ends of the spokes 18 may be of various configurations to provide for captured rotation of the yoke 17 within the fitting 9. FIG. 4 shows to an enlarged scale the formation depicted in FIG. 2, where the spokes 18 are rectangular with a square cutout 19 to provide a pair of spaced longitudinally extending lateral lugs 20.

Several embodiments have been described in the foregoing passages, but it should be appreciated that other forms, modifications and refinements are feasible within the scope of this invention.

What I claim is:

1. A fitting for holding together a cluster of fencing posts driven in juxtaposition into the ground to form a single strainer post, said fitting comprising a base, a U-bolt whose arms are threaded and pass through the base and are provided with nuts for clamping thereto, and a yoke, having spokes radiating from a hub, captured between the U-bolt and the base and providing a plurality of spaces defined by the U-bolt, the spokes and the base, the arrangement being such that by tightening of the nuts for clamping said spaces are reduced in area.

2. A fitting as claimed in claim 1, wherein said spokes at their outer ends have a slot large enough to accommodate the U-bolt and portion of the base.

3. A fitting as claimed in claim 2, wherein the base has a bottom penetrated by the arms of the U-bolt and parallel side walls between which the U-bolt extends, said side walls having confronting arcuate cutouts, and the marginal edges of the side walls at said cutouts being enclosed by some of the spokes of said yoke.

4. A fitting as claimed in claim 3, wherein a reinforcing plate bridges the open ends of said parallel side walls at each of the two opposite ends of the base.

5. A fitting as claimed in claim 1, wherein the yoke is constructed in multiple sections of sheet metal which are interconnected at said hub.

6. A method of construction of a strainer post comprising the steps of:
    inserting a first post through a first space in a first fitting comprising
        a base,
        a U-bolt whose arms are threaded and pass through the base and are provided with nuts for clamping thereto, and
        a yoke, having spokes radiating from a hub, captured between the U-bolt and the base and providing a plurality of spaces defined by the U-bolt, the spokes and the base, the arrangement being such that by tightening of the nuts for clamping said spaces are reduced in area;
    driving the post into the ground,
    inserting a second post through a second space in said fitting,
    driving the second post into the ground,
    locating a second fitting at an upper part of and enclosing said posts,
    said second fitting comprising a base, a U-bolt whose arms are threaded and pass through the base and are provided with nuts for clamping thereto, and a yoke,
    having spokes radiating from a hub,
    captured between the U-bolt and the base and providing a plurality of spaces defined by the U-bolt,
    the spokes and the base, the arrangement being such that by tightening of the nuts for clamping said spaces are reduced in area;
    clamping said first and second fittings upon the first and second posts.

7. A method according to claim 6, further comprising the additional step of:
    inserting a third post through a third space in said first fitting and driving the third post into the ground,
    wherein each of said three posts are driven on different angles with respect to said fitting, and the three posts are gathered into a cluster by said second fitting.

8. A strainer post which comprises,
    a plurality of star posts; and
    a pair of fittings spaced apart along the length of said strainer post and clamped to hold said star posts together in a cluster, wherein said fittings comprise a base, a U-bolt having arms threaded and passing through said base, with nuts for clamping thereto;
    a yoke, having spokes radiating from a hub, captured between said U-bolt and said base and providing a plurality of spaces defined by said U-bolt, said spokes, and said base, wherein each of said star posts extends through a respective one of said spaces, and said fitting is clamped to said cluster of star posts.

* * * * *